US009785025B2

United States Patent
Lin et al.

(10) Patent No.: US 9,785,025 B2
(45) Date of Patent: Oct. 10, 2017

(54) PIXEL STRUCTURE THAT INCREASES RESPONSE SPEED OF LIQUID CRYSTAL

(71) Applicant: Shenzhen China Star Optoelectronics Technology Co., Ltd., Shenzhen, Guangdong Province (CN)

(72) Inventors: Chiachiang Lin, Shenzhen (CN); Hunglung Hou, Shenzhen (CN)

(73) Assignee: SHENZHEN CHINA STAR OPTOELECTRONICS TECHNOLOGY CO., LTD., Shenzhen, Guangdong Province (CN)

( * ) Notice: Subject to any disclaimer, the term of this patent is extended or adjusted under 35 U.S.C. 154(b) by 107 days.

(21) Appl. No.: 14/824,064

(22) Filed: Aug. 11, 2015

(65) Prior Publication Data

US 2015/0346569 A1 Dec. 3, 2015

Related U.S. Application Data

(63) Continuation of application No. 13/699,726, filed as application No. PCT/CN2012/080482 on Aug. 23, 2012, now Pat. No. 9,140,946.

(30) Foreign Application Priority Data

Aug. 10, 2012 (CN) .......................... 2012 1 0285191

(51) Int. Cl.
*G02F 1/1362* (2006.01)
*G02F 1/1343* (2006.01)
(Continued)

(52) U.S. Cl.
CPC ........ *G02F 1/13624* (2013.01); *G02F 1/1368* (2013.01); *G02F 1/13454* (2013.01); *G02F 1/134363* (2013.01); *G02F 1/136286* (2013.01); *G09G 3/3607* (2013.01); *G09G 3/3611* (2013.01); *G09G 3/3659* (2013.01);
(Continued)

(58) Field of Classification Search
CPC ............ G02F 1/13624; G02F 1/13454; G02F 1/136286; G02F 2001/133397; G02F 2001/134381; G02F 2201/123; G02F 2201/124; G09G 3/3607; G09G 3/3611;
(Continued)

(56) References Cited

U.S. PATENT DOCUMENTS

2009/0174829 A1* 7/2009 Shin .................... G02F 1/13624
349/37
2012/0162560 A1* 6/2012 Oiwa ................ G02F 1/134309
349/43

* cited by examiner

*Primary Examiner* — Michael Caley
*Assistant Examiner* — Angela Davison
(74) *Attorney, Agent, or Firm* — Cheng-Ju Chiang (57) ABSTRACT

A pixel structure is provided to increase a response speed of liquid crystal and includes a first thin-film transistor, a second thin-film transistor, an upper substrate, a lower substrate opposite to the upper substrate, pixel electrodes arranged on the lower substrate, a common electrode arranged on the upper substrate, and assisting electrodes arranged on the lower substrate. The assisting electrodes are arranged to be each sandwiched between every two pixel electrodes. The first thin-film transistor includes a first drain terminal, a first source terminal, and a first gate terminal. The second thin-film transistor includes a second drain terminal, a second source terminal, and a second gate terminal. The pixel electrodes are electrically connected to the second drain terminal. The assisting electrodes are electrically connected to the first drain terminal.

5 Claims, 5 Drawing Sheets

(51) Int. Cl.
  *G02F 1/1345* (2006.01)
  *G02F 1/1368* (2006.01)
  *G02F 1/1333* (2006.01)
  *G09G 3/36* (2006.01)
(52) U.S. Cl.
  CPC ............ *G02F 2001/133397* (2013.01); *G02F 2001/134381* (2013.01); *G09G 2300/043* (2013.01); *G09G 2320/0252* (2013.01)
(58) Field of Classification Search
  CPC ........... G09G 3/3659; G09G 2300/043; G09G 2320/0252
  USPC .................................................... 349/48, 141
  See application file for complete search history.

PIXEL STRUCTURE THAT INCREASES RESPONSE SPEED OF LIQUID CRYSTAL

CROSS REFERENCE TO RELATED APPLICATIONS

This is a continuation of co-pending patent application Ser. No. 13/699,726, filed on Nov. 24, 2012, which is a 35 U.S.C. §371 National Phase conversion of International (PCT) Patent Application No. PCT/CN2012/080482, filed on Aug. 23, 2012, which claims benefit of Chinese Patent application No. 201210285191.1, filed on Aug. 10, 2012, the disclosure of the above is incorporated by reference herein.

BACKGROUND OF THE INVENTION

1. Field of the Invention

The present invention relates to the field of liquid crystal displaying, and in particular to a pixel structure that increases response speed of liquid crystal.

2. the Related Arts

A liquid crystal display (LCD) is a flat and ultra-thin display device that is composed of a number of color or monochrome pixels arranged in front of a light source or a reflection surface. The liquid crystal display has a very low consumption of power and is thus favorable to engineers for being applied to electronic devices powered by electrical cells. The principle is applying electricity to stimulate liquid crystal molecules to generate points, lines, and surfaces that work in combination with a back side lighting tube to constitute an image.

It is known that human eyes have the phenomenon of "persistence of vision", which is a temporal illusion of an image of high speed movement persisting in human brain. Motion pictures and movies, and the recently developed games are applications of the principle of persistence of vision, by which a series of gradually changed pictures that are displayed fast and continuously in front of the human eyes form a dynamic image. The displaying speed of pictures that human being can perceive is 24 pictures each second. This is the reason that movies are shown with a speed of 24 frames each second. If the displaying speed is lower than this level, pauses of pictures and discomfort will be perceived by human beings. Based on such a criterion, each picture must be displayed for a time period shorter than 40 ms. Consequently, for a liquid crystal display, a response time of 40 ms is a threshold. Any displaying device having a response time higher than 40 ms will display phenomenon of "trailing image" or "image sticking". Thus, the first factor that is taken into consideration by general consumers in purchasing a liquid crystal display or a liquid crystal television is the response time of liquid crystal.

Figure 1A:
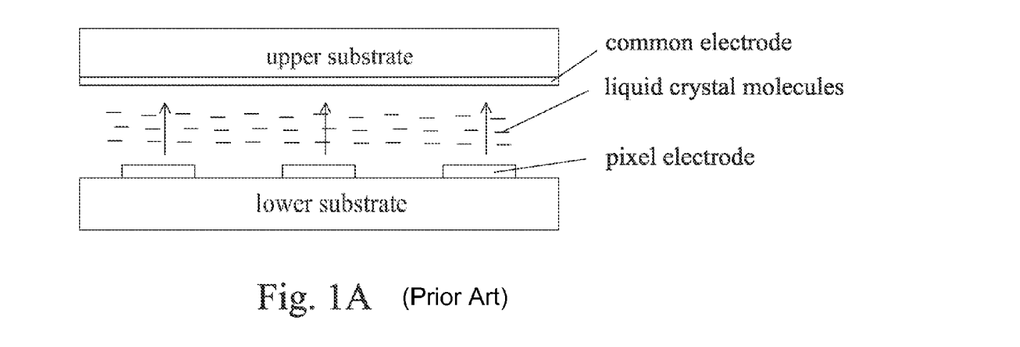
FIG. 1A is a schematic view showing the condition of liquid crystal under a strong electrical field applied by a conventional pixel structure.
Figure 1B:
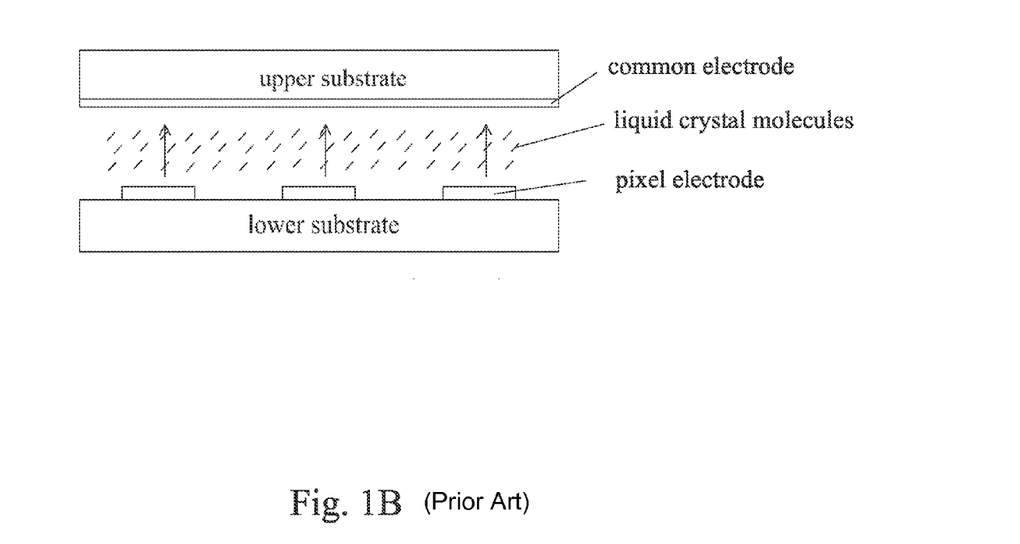
FIG. 1B is a schematic view showing the condition of liquid crystal under a weak electrical field applied by a conventional pixel structure.
Figure 1C:
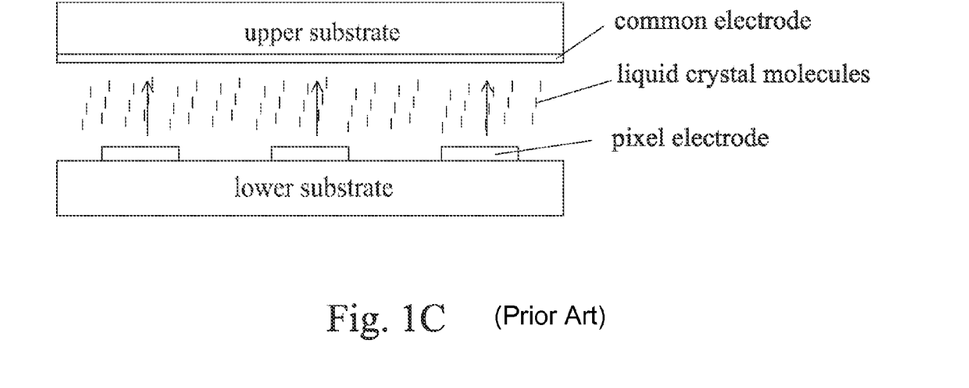
FIG. 1C is a schematic view showing the condition of liquid crystal under a null electrical field applied by a conventional pixel structure.

The response time is the speed that each pixel of a liquid crystal display responds to an input signal and is the time interval that a pixel turns from dark into bright or from bright into dark. The commonly mentioned 25 ms and 16 ms are exactly the response time. The shorter the response time is, the less the image trailing will be perceived by a viewer in viewing a dynamic image. The principle is to apply electrical voltage to a liquid crystal box to have the liquid crystal molecules twisted and restored. Referring to FIGS. 1A-1C, schematic views illustrating the twists of liquid crystal under electric fields of various intensities are given. When the electric field has a strong intensity, the liquid crystal is approximately horizontal, where the image is brightest. When the electrical field is of a weak intensity or is null, the liquid crystal is approximately vertical, where the image is darkest.

Factors that affect the response time of liquid crystal can be classified as two categories:

(1) material of liquid crystal, including the thickness of liquid crystal inside the liquid crystal box, the dielectric constant of liquid crystal, viscosity of liquid crystal, and elastic constant of liquid crystal; and (2) action between light guide plate and external force, including the intensity of electric field externally applied to liquid crystal and alignment power of alignment layer.

The continuous progress of technology brings constant improvement of LCD techniques and it is now a challenge topic of the development of liquid crystal displays to further improve the response speed of liquid crystal in order to take an invincible foundation in the LCD business.

SUMMARY OF THE INVENTION

An object of the present invention is to provide a pixel structure that increases response speed of liquid crystal, whereby an assisting electric field is applied when liquid crystal is being converted from a horizontal condition to a vertical condition in order to increase the conversion speed and thus increases the response speed of liquid crystal to thereby well improve the image sticking phenomenon of 3D image.

To achieve the object, the present invention provides a pixel structure that increases response speed of liquid crystal, which comprises a first thin-film transistor, a second thin-film transistor, an upper substrate, a lower substrate opposite to the upper substrate, pixel electrodes arranged on the lower substrate, a common electrode arranged on the upper substrate, and assisting electrodes arranged on the lower substrate. The assisting electrodes are arranged to be each sandwiched between every two pixel electrodes. The first thin-film transistor comprises a first drain terminal, a first source terminal, and a first gate terminal. The second thin-film transistor comprises a second drain terminal, a second source terminal, and a second gate terminal. The pixel electrodes are electrically connected to the second drain terminal. The assisting electrodes are electrically connected to the first drain terminal.

The first and second thin-film transistors control the pixel electrodes and the assisting electrodes in such a way that a predetermined voltage difference exists therebetween in a predetermined period of time.

The pixel structure further comprises a first source driver, a first gate driver, a second source driver, and a second gate driver. The first source driver is electrically connected to the first source terminal of the first thin-film transistor. The second source driver is electrically connected to the second source terminal of the second thin-film transistor. The first gate driver is electrically connected to the first gate terminal of the first thin-film transistor. The second gate driver is electrically connected to the second gate terminal of the second thin-film transistor.

The pixel electrodes comprise a first connection substrate. The pixel electrodes are arranged on the first connection substrate in a comb-like distribution.

The assisting electrodes comprise a second connection substrate. The assisting electrodes are arranged on the second connection substrate in a comb-like distribution.

The assisting electrodes and the pixel electrodes are arranged to alternate each other.

Every two of the pixel electrodes sandwich therebetween one of the assisting electrodes.

Every two of the assisting electrodes sandwich therebetween two of the pixel electrodes.

The pixel structure further comprises a liquid crystal layer arranged between the upper and lower substrates.

The present invention also provides a pixel structure that increases response speed of liquid crystal, which comprises a first thin-film transistor, a second thin-film transistor, an upper substrate, a lower substrate opposite to the upper substrate, pixel electrodes arranged on the lower substrate, a common electrode arranged on the upper substrate, and assisting electrodes arranged on the lower substrate, the assisting electrodes being arranged to be each sandwiched between every two pixel electrodes, the first thin-film transistor comprising a first drain terminal, a first source terminal, and a first gate terminal, the second thin-film transistor comprising a second drain terminal, a second source terminal, and a second gate terminal, the pixel electrodes being electrically connected to the second drain terminal, the assisting electrodes being electrically connected to the first drain terminal;

wherein the first and second thin-film transistors control the pixel electrodes and the assisting electrodes in such a way that a predetermined voltage difference exists therebetween in a predetermined period of time;

further comprising a first source driver, a first gate driver, a second source driver, and a second gate driver, the first source driver being electrically connected to the first source terminal of the first thin-film transistor, the second source driver being electrically connected to the second source terminal of the second thin-film transistor, the first gate driver being electrically connected to the first gate terminal of the first thin-film transistor, the second gate driver being electrically connected to the second gate terminal of the second thin-film transistor;

wherein the pixel electrodes comprises a first connection substrate, the pixel electrodes being arranged on the first connection substrate in a comb-like distribution;

wherein the assisting electrodes comprises a second connection substrate, the assisting electrodes being arranged on the second connection substrate in a comb-like distribution;

wherein the assisting electrodes and the pixel electrodes are arranged to alternate each other;

wherein every two of the pixel electrodes sandwich therebetween one of the assisting electrodes; and further comprising a liquid crystal layer arranged between the upper and lower substrates.

The efficacy of the present invention is that the present invention provides a pixel structure that increases response speed of liquid crystal, which adds assisting electrodes on a lower substrate and makes use of proper coordination of timing among driving voltages to provide a predetermined voltage difference between the assisting electrodes and pixel electrodes, whereby when liquid crystal is converted from a horizontal condition to a vertical condition, a sideways electric field is induced to provide an assistance to an electric field for increasing the conversion speed thereby increasing response speed of the liquid crystal and well improving the phenomenon of image sticking in 3D image.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 2:
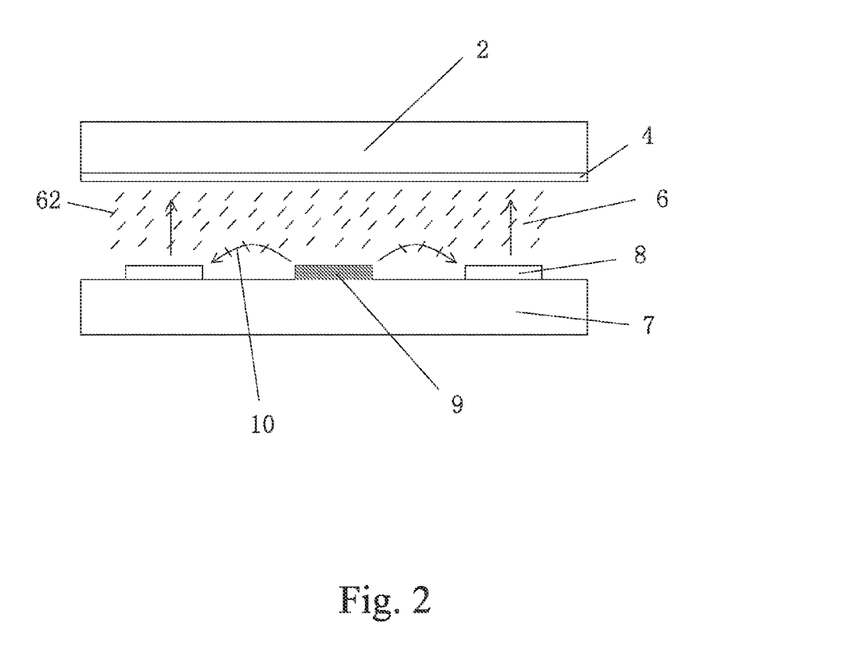
FIG. 2 is a schematic view showing upper and lower substrates, an assisting electrode, and a pixel electrode of a pixel structure that increases response speed of liquid crystal according to the present invention.
Figure 3:
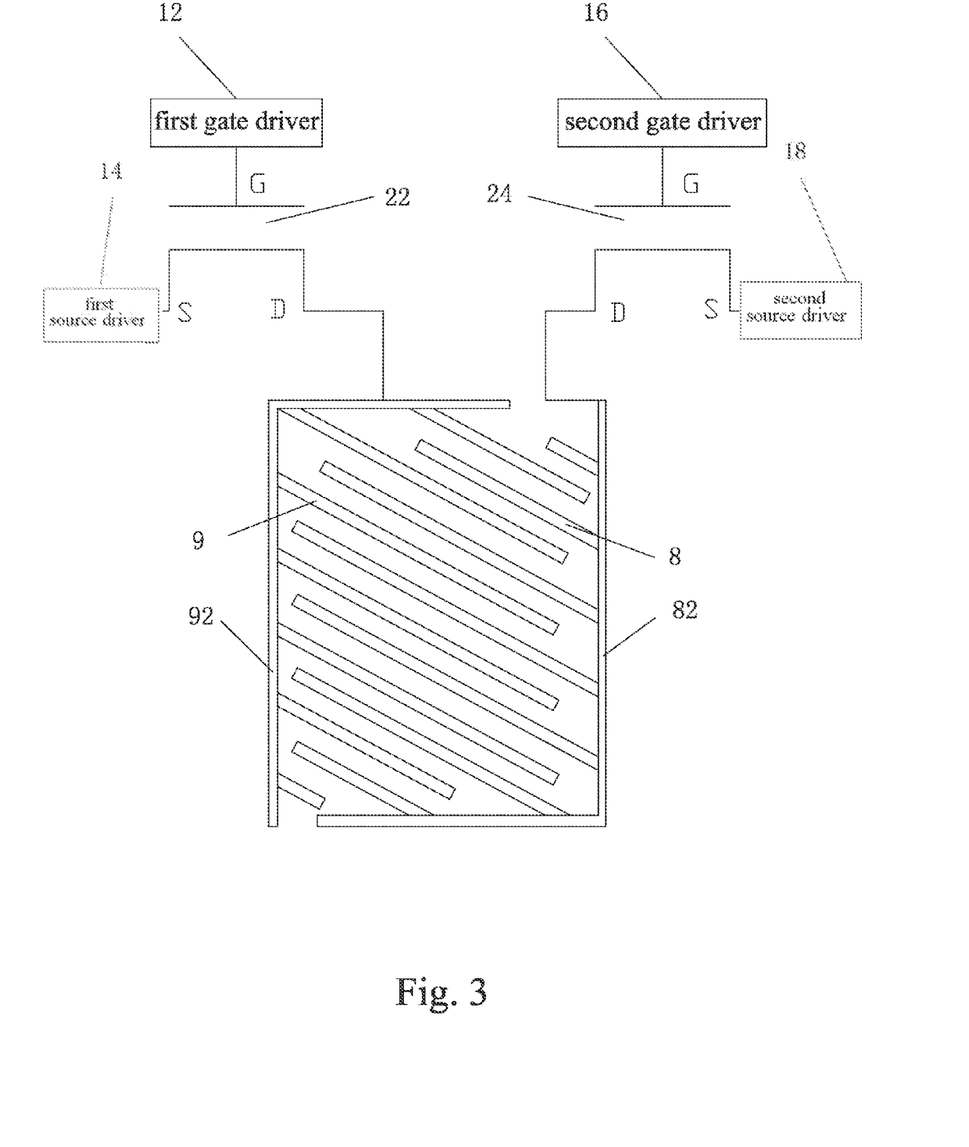
FIG. 3 is a schematic view showing connection among thin-film transistors, the assisting electrode, and the pixel electrode of the pixel structure that increases response speed of liquid crystal according to an embodiment of the present invention.
Figure 4:
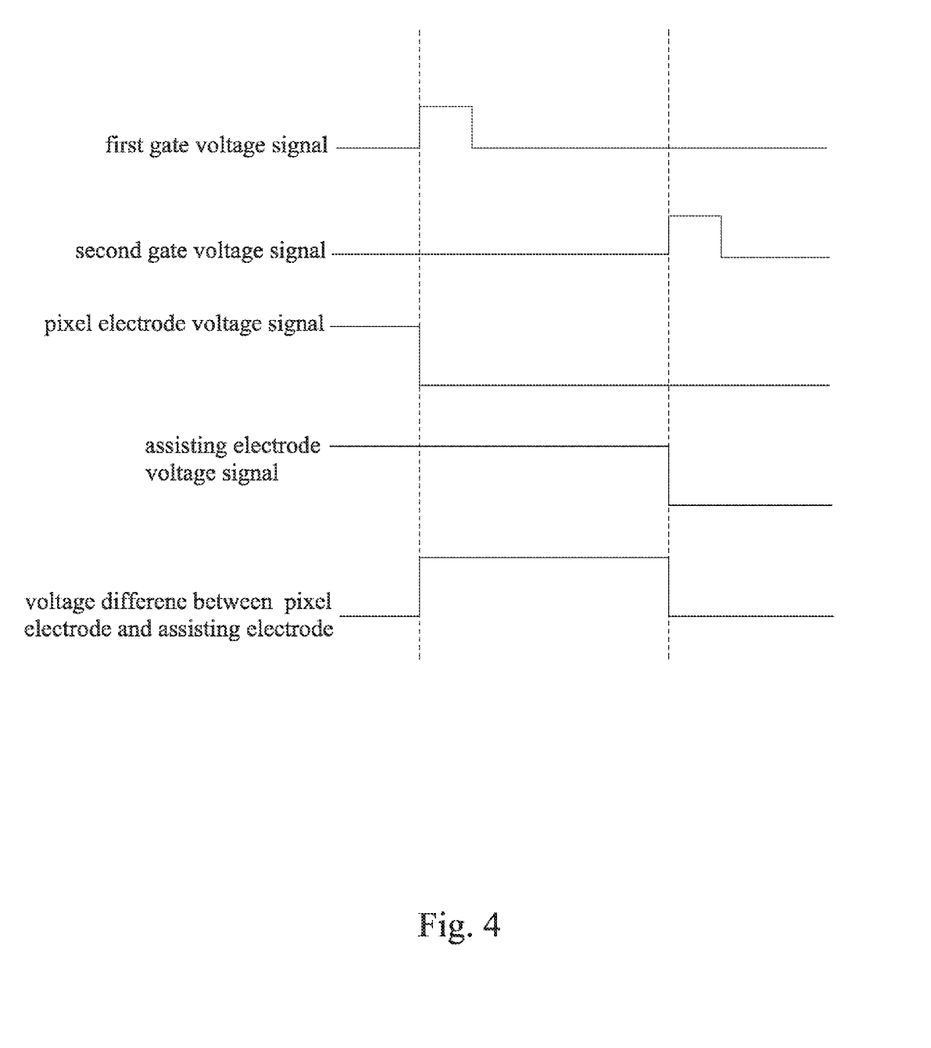
FIG. 4 is signal timing diagrams of the pixel structure that increases response speed of liquid crystal according to the present invention.

Referring to FIGS. 2-4, the present invention provides a pixel structure that increases response speed of liquid crystal, which comprises: a first thin-film transistor 22, a second thin-film transistor 24, an upper substrate 2, a lower substrate 7 opposite to the upper substrate 2, pixel electrodes 8 arranged on the lower substrate 7, a common electrode 4 arranged on the upper substrate 2, and assisting electrodes 9 arranged on the lower substrate 7. Each of the assisting electrodes 9 is arranged between two pixel electrodes 8. The first thin-film transistor 22 comprises a first drain terminal D, a first source terminal S, and a first gate terminal G. The second thin-film transistor 24 comprises a second drain terminal D, a second source terminal S, and a second gate terminal G. The pixel electrodes 8 are electrically connected to the second drain terminal D. The assisting electrodes 9 are electrically connected to the first drain terminal D. As shown in FIG. 4, the first and second thin-film transistors 22, 24 control the pixel electrodes 8 and the assisting electrodes 9 in such a way that a predetermined voltage difference exists therebetween in a predetermined period of time.

The pixel structure that increases response speed of liquid crystal according to the present invention further comprises a liquid crystal layer 6 arranged between the upper and lower substrates 2, 7. Without making change to the existing liquid crystal material and alignment material, the present invention uses the assisting electrodes 9 to provide a sideways electric field 10, whereby when liquid crystal molecules 62 are converted from high voltage driving by the pixel electrodes (where the liquid crystal molecules 62 approximate horizontal) to low voltage driving (where the liquid crystal molecules 62 approximate vertical), an assistance is supplied to the liquid crystal molecules 62 to increase the response speed of the liquid crystal molecules 62 changing from a horizontal condition to a vertical condition.

The pixel structure that increases response speed of liquid crystal according to the present invention further comprises: a first source driver 14, a first gate driver 12, a second source driver 18, and a second gate driver 16. The first source driver 14 is electrically connected to the first source terminal S of the first thin-film transistor 22. The second source driver 18 is electrically connected to the second source terminal S of the second thin-film transistor 2. The first gate driver 12 is electrically connected to the first gate terminal G of the first thin-film transistor 22. The second gate driver 16 is electrically connected to the second gate terminal G of the second thin-film transistor 24. By applying the first and second source drivers 14, 18 and the first and second gate drivers 12, 16 to drive the first and second thin-film transistors 22, 24, the assisting electrodes 9 that are electrically connected to the first drain terminal D and the pixel electrodes 8 that are electrically connected to the second drain terminal D are respectively provided with identical or different driving voltages at a given time point so that the pixel electrodes 8 and the assisting electrodes 9 are provided with a predetermined voltage difference in a predetermined period of time (as shown in FIG. 4). With proper coordination between the timing of driving voltages, assistance can be realized to help twisting the liquid crystal molecules 62 in a predetermined period of time.

The pixel electrodes 8 comprise a first connection substrate 82 and the pixel electrodes 8 are arranged to show a comb-like distribution on the first connection substrate 82. The assisting electrodes 9 comprises a second connection substrate 92 and the assisting electrodes 9 are arranged to show a comb-like distribution on the second connection substrate 92.

In a preferred embodiment of the present invention, the assisting electrodes 9 and the pixel electrodes 8 are arranged to alternate each other. Preferably, every two pixel electrodes 8 sandwich therebetween one of the assisting electrodes 9.

Figure 5:
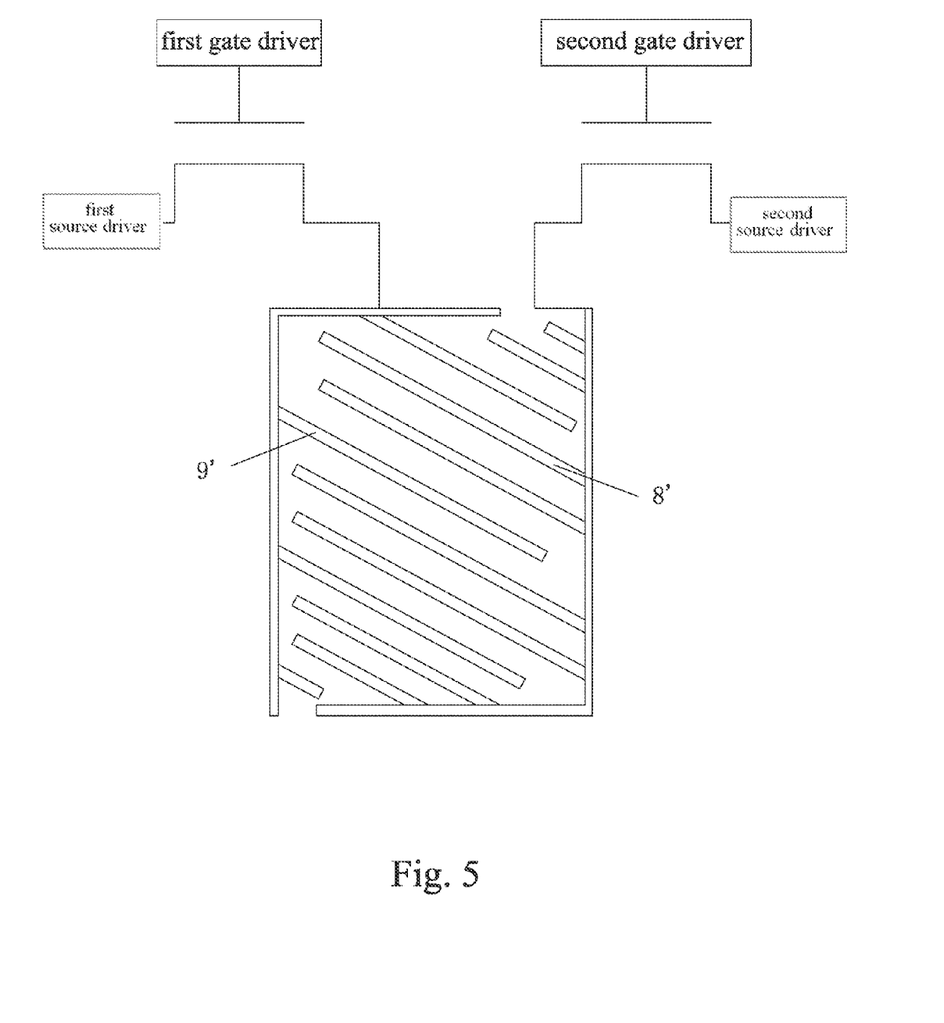
FIG. 5 is a schematic view showing connection among thin-film transistors, the assisting electrode, and the pixel electrode of the pixel structure that increases response speed of liquid crystal according to another embodiment of the present invention.

Referring to FIG. 5, an alternative preferred embodiment is provided, in which every two assisting electrodes 9' sandwich therebetween two pixel electrodes 8'.

In summary, the present invention provides a pixel structure that increases response speed of liquid crystal, which adds assisting electrodes on a lower substrate and makes use of proper coordination of timing among driving voltages to provide a predetermined voltage difference between the assisting electrodes and pixel electrodes, whereby when liquid crystal is converted from a horizontal condition to a vertical condition, a sideways electric field is induced to provide an assistance to an electric field for increasing the conversion speed thereby increasing response speed of the liquid crystal and well improving the phenomenon of image sticking in 3D image.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A pixel structure, comprising a first thin-film transistor, a second thin-film transistor, an upper substrate, a lower substrate opposite to the upper substrate, pixel electrodes arranged on the lower substrate, a common electrode arranged on the upper substrate, and assisting electrodes arranged on the lower substrate, the assisting electrodes being arranged to be each sandwiched between every two pixel electrodes, the first thin-film transistor comprising a first drain terminal, a first source terminal, and a first gate terminal, the second thin-film transistor comprising a second drain terminal, a second source terminal, and a second gate terminal, the pixel electrodes being electrically connected to the second drain terminal, the assisting electrodes being electrically connected to the first drain terminal;

wherein a first gate driver and a second gate driver supply a first gate signal and a second gate signal, which is different from the first gate signal, to the first thin-film transistor and the second thin-film transistor of the pixel structure, respectively, and wherein a first source driver and a second source driver are connected, respectively, to the assisting electrodes and the pixel electrodes of the lower substrate of the pixel structure to set up a voltage difference between the pixel electrodes and the assisting electrodes; and wherein every two of the assisting electrodes sandwich therebetween two of the pixel electrodes and every two of the pixel electrodes sandwich therebetween a single one of the assisting electrodes.

2. The pixel structure as claimed in claim 1, wherein the pixel electrodes comprise a first connection substrate, the pixel electrodes being arranged on the first connection substrate in a comb-like distribution.

3. The pixel structure as claimed in claim 1, wherein the assisting electrodes comprise a second connection substrate, the assisting electrodes being arranged on the second connection substrate in a comb-like distribution.

4. The pixel structure as claimed in claim 1, further comprising a liquid crystal layer arranged between the upper and lower substrates.

5. A pixel structure, comprising a first thin-film transistor, a second thin-film transistor, an upper substrate, a lower substrate opposite to the upper substrate, a liquid crystal layer between the upper and lower substrates, pixel electrodes arranged on the lower substrate, a common electrode arranged on the upper substrate, and assisting electrodes arranged on the lower substrate, the assisting electrodes being arranged to be each sandwiched between every two pixel electrodes, the first thin-film transistor comprising a first drain terminal, a first source terminal, and a first gate terminal, the second thin-film transistor comprising a second drain terminal, a second source terminal, and a second gate terminal, the pixel electrodes being electrically connected to the second drain terminal, the assisting electrodes being electrically connected to the first drain terminal;

wherein a first gate driver and a second gate driver supply a first gate signal and a second gate signal, which is different from the first gate signal, to the first thin-film transistor and the second thin-film transistor of the pixel structure, respectively, and wherein a first source driver and a second source driver are connected, respectively, to the assisting electrodes and the pixel electrodes of the lower substrate of the pixel structure to set up a voltage difference between the pixel electrodes and the assisting electrodes;

wherein the pixel electrodes are arranged in a first comb-like distribution and the assisting electrodes are arranged in a second comb-like distribution, the first and second comb-like distributions being such that the assisting electrodes and the pixel electrodes alternate with each other; and wherein every two of the assisting electrodes sandwich therebetween two of the pixel electrodes and every two of the pixel electrodes sandwich therebetween a single one of the assisting electrodes.

\* \* \* \* \*